June 8, 1965   J. W. WILKINSON   3,187,896
OIL FILTER
Filed March 18, 1959
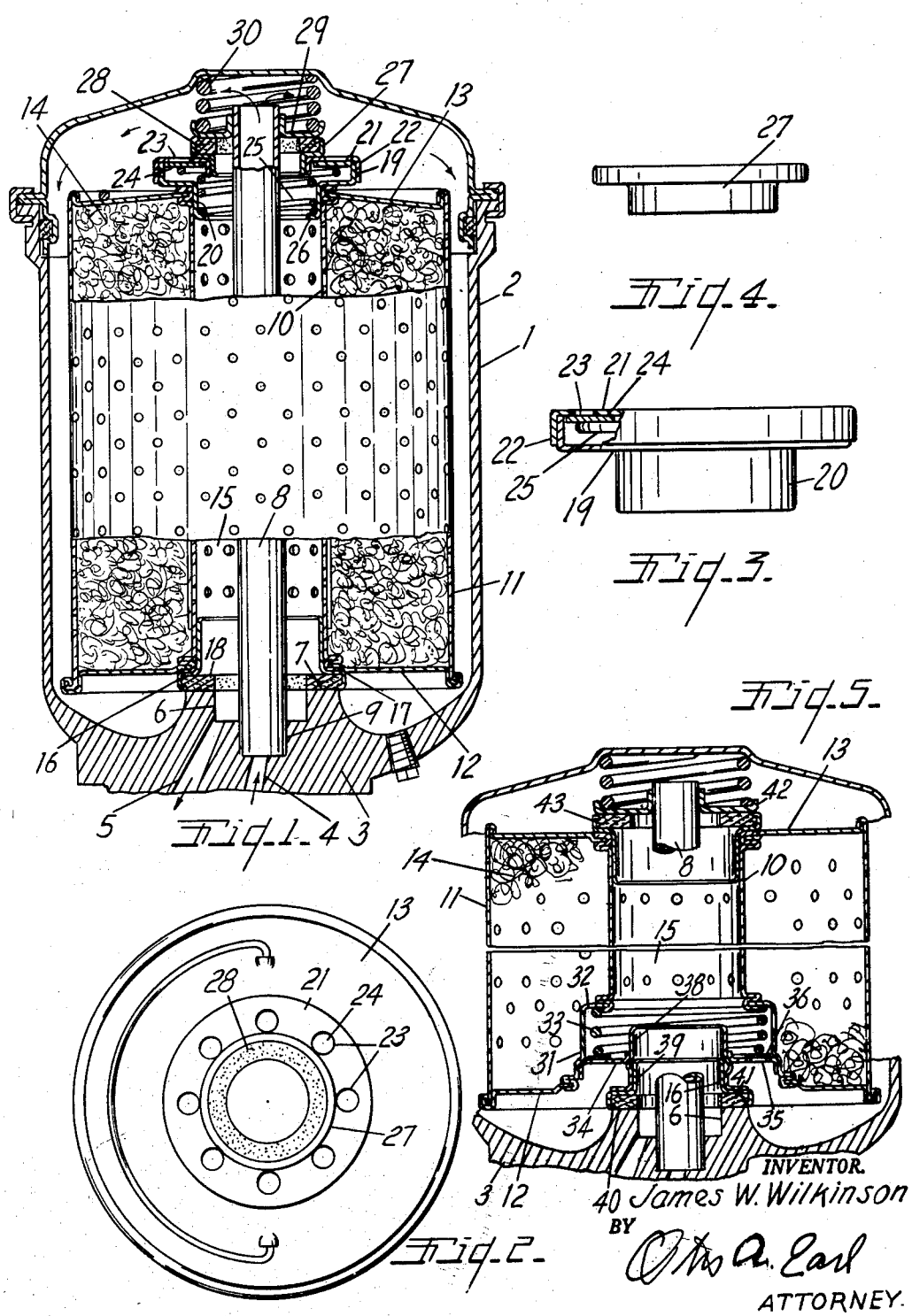
INVENTOR.
James W. Wilkinson
BY
Otho A. Earl
ATTORNEY.

United States Patent Office 3,187,896
Patented June 8, 1965

3,187,896
OIL FILTER
James W. Wilkinson, Hastings, Mich., assignor to Hastings Manufacturing Company, Hastings, Mich., a corporation of Michigan
Filed Mar. 18, 1959, Ser. No. 800,271
2 Claims. (Cl. 210—130)

This invention relates to filters well adapted for the filtering of lubricating oil of internal combustion engines which is translated through the filter under substantial pressure. The main objects of this invention are, First, to provide a filter adapted for use in filtering oil of internal combustion engines and the like, the filter proper including a safety valve which permits bypassing flow of the lubricant in the event that the filter becomes clogged or otherwise in such condition as to prevent the desired flow of lubricant therethrough.

Second, to provide a filter and pressure relief valve assembly which is adapted for use in connection with largely used types of filter housings or casings.

Third, to provide a filter and relief valve assembly which is very compact, enabling its use in filter casings of widely used types.

Fourth, to provide a filter structure having these advantages which is very economical in its parts and which does not require technical skill in installing.

Objects relating to details and economies of the invention will appear from the description to follow. The invention is defined and pointed out in the claims.

A preferred embodiment of the invention is illustrated in the accompanying drawing, in which:

FIG. 1 is a fragmentary view partially in vertical section of a filter embodying my invention.

FIG. 2 is a plan view of the filter unit removed from the casing.

FIG. 3 is an enlarged side elevational view partially in section of the valve proper of the embodiment shown in FIGS. 1 and 2.

FIG. 4 is an enlarged side elevational view of the discharge passage seal member of the embodiment shown in FIGS. 1, 2 and 3.

FIG. 5 is an enlarged fragmentary view in vertical section of a modified form or embodiment of my invention in which the pressure relief or bypass valve is disposed at the bottom of the filter instead of at the top, as is illustrated in FIG. 1.

In the embodiment illustrated in the accompanying drawing, the filter casing designated generally by the numeral 1 is substantially that of my Patent No. 2,855,104, issued October 7, 1958, and it comprises the body member 2 having an integral bottom 3 provided with an inlet passage 4 and outlet passage 5. These passages are surrounded by the upwardly projecting annular member 6 having an upwardly facing valve seat 7 on its upper edge. The inlet tube 8 is seated in a socket or enlargement 9 at the upper end of the inlet 4. I have not illustrated the pipe connections for the lubricant to be filtered, as such connections form no part of this invention, but it will be understood that the oil or other material filtered is commonly circulated under a substantial pressure necessary or deemed desirable for circulating the fluid through the lubricated parts.

The filter cartridge of the embodiment illustrated comprises an inner foraminate wall 10 and an outer wall 11 arranged in spaced concentric relation and connected by the bottom wall 12 and top wall 13 providing a chamber for the filtering material 14, which is desirably cotton linters packed to uniform density, as is disclosed in my Letters Patent No. 2,797,811, issued July 2, 1957. The filtering material, however, forms no part of this invention. The inner filter wall 10 is spaced from the inlet tube 8 to provide a discharge passage 15 receiving the filtered material from the foraminated inner filter wall 10. The tube 8 discharges into the top of the casing above the filter and under desired conditions the discharged oil passes downwardly and through the filter to the discharge passage.

The filter is provided with a holder 16 telescoped in the lower end of the inner filter wall and provided with a downwardly facing seat 17 for the gasket 18, the gasket coacting with the seat 7 surrounding the recess 6 in the bottom. The pressure relief valve in the embodiment illustrated comprises the casing member 19 having a sleeve portion 20 fittingly supported within the upper end of the inner wall of the filter. The valve seat member 21 is provided with a downwardly projecting flange 22 fittingly engaging the upturned flange on the casing member 19, see FIG. 3. This seat member is annular and is provided with a series of spaced inlets 23. The valve 24 is annular and seats against the valve seat member as is illustrated in FIGS. 1 and 3 and is yieldingly urged against its seat by the coil spring 25 seated on the inturned flange 26 of the casing member 20, see FIG. 1. This spring has a predetermined tension, that is, it yields under certain predetermined pressure or thrust on the valve.

The upper end of the discharge passage 15 is closed, the valve casing being provided with an upwardly facing gasket seat member 27 for the gasket 28. The discharge passage closure 29 is vertically reciprocable upon the discharge tube and is urged upon the seat by the spring 30. With this arrangement, when the pressure within the filter casing reaches a predetermined point the valve opens allowing the oil or other filtered liquid to bypass the filter and to discharge through the valve to the outlet 5.

In the embodiment of my invention shown in FIG. 5, the relief valve is built into the filter as distinguished from being a separate valve which is inserted into the filter as has been described. In this embodiment the casing is or may be the same as has been described. The valve casing 31 is connected at its upper end to the lower end of the filter wall 10 which is of a reduced length as compared to that shown in FIG. 1, and its lower end is connected to the bottom 12, the valve casing being seamed to the lower end of the wall 10 and to the bottom. It is of a diameter somewhat exceeding that of the inner filter wall 10 to provide a shoulder 32 constituting a seat for the spring 33. The valve seat 34 is mounted adjacent the lower end of the valve casing and is provided with a series of openings 35, the valve 36 being urged upon this seat by the spring 33. The tubular support 38 is shouldered to engage the valve seat member and has the gasket seat member 39 telescoped therein and provided with a downwardly facing seat 40 for the gasket 41 seated upon the gasket seat 7.

The top closure member 42 has thrust engagement with the gasket 43 at the upper end of the filter. The embodiment of this FIG. 5 functions the same as the embodiment of FIGS. 1 to 4 inclusive, that is, the valve opens under predetermined pressure to allow the oil to flow around the filter to the discharge passage.

I have illustrated and described two highly practical embodiments of my invention. I have not illustrated or described other embodiments or adaptations, as it is believed that this disclosure will enable those skilled in the art to embody or adapt my invention as may be desired.

Having thus described the invention, what is claimed as new and desired to secure by Letters Patent is:

1. In a filter for a pressure circulated medium, the combination of a casing including a bottom having an inlet opening and a discharge opening therein and having an upwardly facing cartridge seat surrounding said openings, an inlet tube mounted on said casing bottom in communication with said inlet opening thereof and discharging at the outer end of said casing, a filter cartridge containing a compressed fibrous filtering medium supportedly seated on said bottom and removably associated with said inlet tube and comprising end walls and inner and outer foraminate walls, there being a discharge passage between said inner cartridge wall and said inlet tube, a valve casing disposed at and fixedly connected to said inner cartridge wall at its lower end, a valve seat member disposed within said valve casing and having inlet openings therein, a tubular discharge member for said valve casing disposed through said valve seat and seated upon said cartridge seat on said bottom to discharge into said discharging opening of said casing bottom, a valve disposed within said valve casing in coacting relation to said valve seat thereof, and a coil spring supportedly disposed within said valve casing in coacting relation to said valve and tensioned to hold the valve on its seat under predetermined pressure required for passing of the circulated medium through the filtering material within the cartridge.

2. In a filter for a pressure circulated medium, the combination of a casing including a bottom having an inlet opening and a discharge opening therein and having an upwardly facing cartridge seat surrounding said openings, an inlet tube mounted on said casing bottom in communication with said inlet opening thereof and discharging at the outer end of said casing, a filter cartridge containing a filtering medium supportedly seated on said bottom and removably associated with said inlet tube and comprising an inner wall, there being a discharge passage between said inner cartridge wall and said inlet tube and into which said cartridge discharges, a valve casing disposed at and fixedly connected to said inner cartridge wall at its lower end, a valve seat member in said valve casing and having inlet openings therein to said casing at the outer side of said cartridge, said valve casing having a discharge connection to said discharge opening of said bottom, and a pressure relief valve disposed within said valve casing in coacting relation to said valve seat thereof.

References Cited by the Examiner
UNITED STATES PATENTS

| 511,798 | 1/94 | Rankine | 210—130 |
| 1,568,796 | 1/26 | Breer | 210—130 |
| 2,183,616 | 12/39 | Korte | 210—130 |
| 2,533,266 | 12/50 | Kovacs et al. | 210—130 |
| 2,598,322 | 5/52 | Vokes | 210—130 |
| 2,615,573 | 10/52 | Storey | 210—130 |
| 2,729,339 | 1/56 | McCoy | 210—130 X |
| 2,731,154 | 1/56 | Burnell | 210—130 X |
| 2,855,103 | 10/58 | Wilkinson | 210—315 |
| 2,888,141 | 5/59 | Coates et al. | |

REUBEN FRIEDMAN, *Primary Examiner.*

HERBERT L. MARTIN, HERMAN BERMAN,
*Examiners.*